W. G. ADAMS.
VEHICLE WHEEL RIM.
APPLICATION FILED DEC. 27, 1916.
1,355,641.
Patented Oct. 12, 1920.
2 SHEETS—SHEET 2.
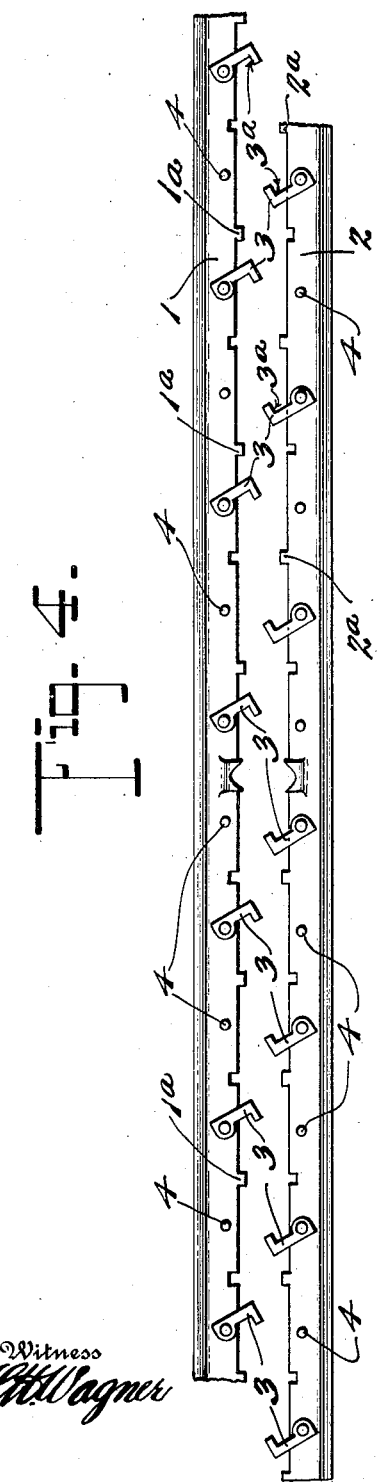
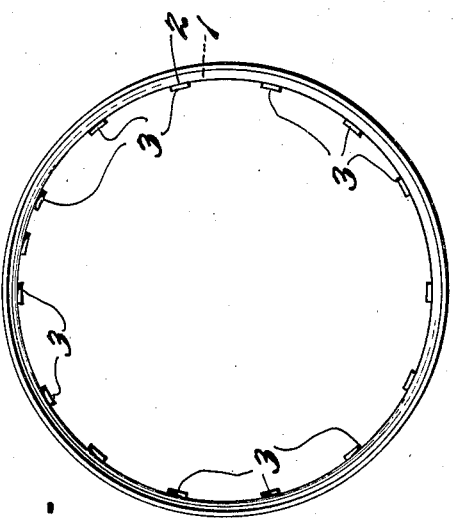
Inventor
William G. Adams

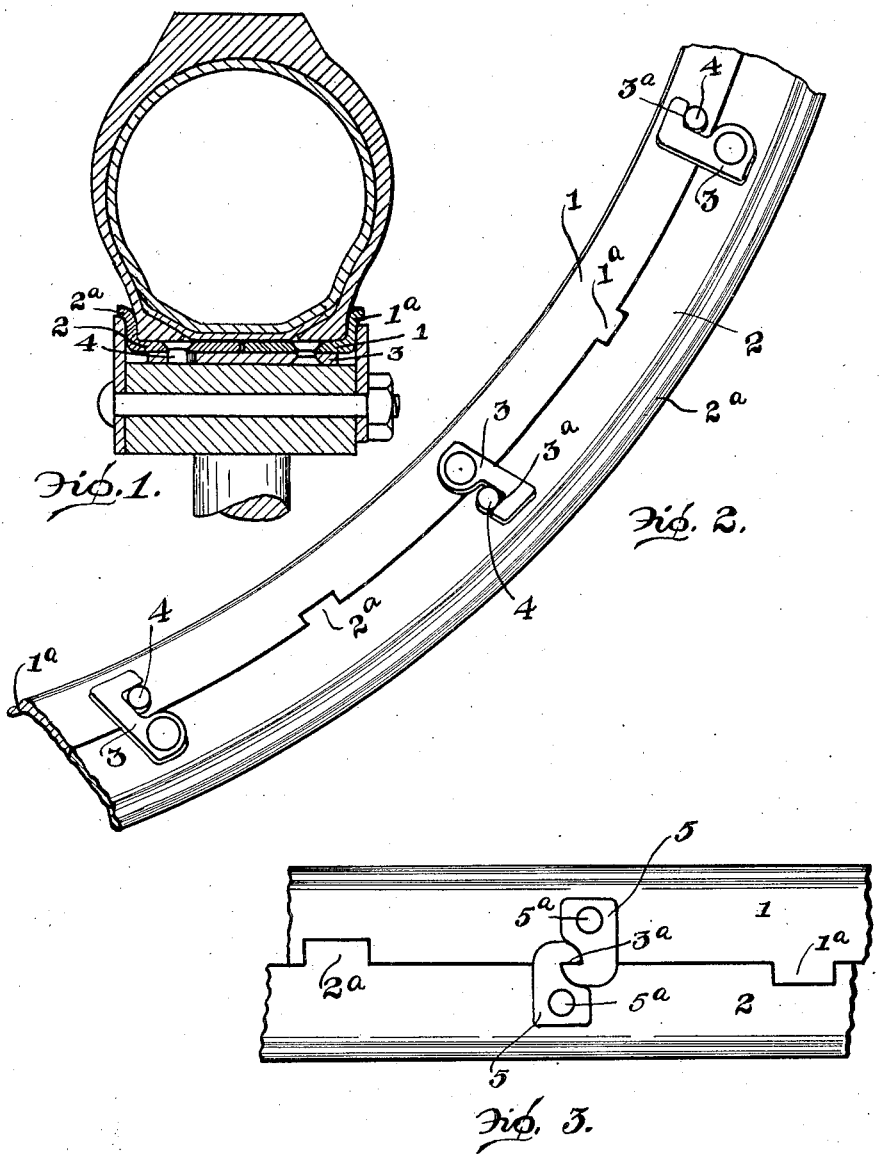

UNITED STATES PATENT OFFICE.

WILLIAM G. ADAMS, OF EAST SAN DIEGO, CALIFORNIA.

VEHICLE-WHEEL RIM.

1,355,641.  Specification of Letters Patent.  Patented Oct. 12, 1920.

Application filed December 27, 1916. Serial No. 139,109.

*To all whom it may concern:*

Be it known that I, WILLIAM G. ADAMS, a citizen of the United States, residing at East San Diego, in the county of San Diego and State of California, have invented certain new and useful Improvements in Vehicle-Wheel Rims, of which the following is a specification.

My invention relates to rims for vehicle wheels more particularly demountable rims preferably for use in connection with the ordinary pnuematic tires of various types as desired. The objects of my invention are; first, to provide a rim of this class which is readily removed from the tire with but slight effort on the part of the operator; second, to provide a rim of this class in which no tire tools are necessary for separating the tire from the rim, third, to provide a rim of this class which is made in two parts separating in the middle, the halves being duplicate; fourth, to provide a rim of this class which is applicable to the different kinds and classes of tires now in use, and; fifth, to provide a rim of this class which is simple and economical of construction, durable, easy to install, easy to operate, and will not readily deteriorate or get out of order.

With these and other objects in view as will appear hereinafter, my invention consists of certain novel features of construction, combination and arrangement of parts, as will be hereinafter described in detail and particularly set forth in the appended claims, reference being had to the accompanying drawings and to the characters of reference thereon which form a part of this specification in which:

Figure 1 is a sectional view of an ordinary straight side tire shown mounted on my rim, and the rim positioned on the felly.

Fig. 2 is a fragmentary perspective view of the rim alone shown in the preferred form, and Fig. 3 is a fragmentary top view of the inside of said rim in a slightly modified form from that of Fig. 2. Fig. 4 is a view showing the development of the duplicate rim members, a section of which is shown in Fig. 2, and Fig. 5 is a side elevation of the rim.

Similar characters of reference refer to similar parts throughout the several views.

The rim member 1, rim member 2, hook member 3 and lug 4 constitute the principal parts of my rim structure.

The rim members 1 and 2 are annular metallic pieces provided with flanges $1^a$ and $2^a$ in the form of the ordinary conventional rim for the straight side tire; however, it is obvious that this rim may be formed with a curve in the same form as the clencher tire rim without departing from the invention. The two members 1 and 2 when placed together as shown form the rim and they are each provided with lugs $1^a$ and $2^a$ which are adapted to fit in notches in the adjacent half to prevent the rim members from moving relatively to each other torsionally. The two halves 1 and 2 are held together by means of the hooks 3 which are secured to the opposite halves 1 and 2 of the rim and adjacent the hook on one half and adapted to be engaged by said hook is the lug 4 on the other half which engages the hook member, the inner edge $3^a$ of which is slightly beveled so that when the hook is properly engaged with the lug the two half members 1 and 2 are tight together. Thus it will be seen that the two halves 1 and 2 together with their connecting parts are the same in every particular, so that the half is all that is required to be made and two of them placed together to form the rim. In the modified form of construction shown in Fig. 3 of the drawing the rim structure is the same except that instead of the hooks 3 and lugs 4 there are provided two hook members 5 which are pivotally mounted on countersunk rivets $5^a$ and their extended hook members engage each other, the engaging surfaces of each of said hooks being slightly beveled so that when said engaging surfaces are forced together they force the two rim members 1 and 2 together in the position shown best in Fig. 3 of the drawings.

Though I have shown and described a particular construction, combination and arrangement of parts, I do not wish to be limited to this particular construction, combination and arrangement, but desire to include in the purview of my invention the construction, combination and arrangement substantially as set forth in the appended claims.

It is obvious that with this construction there is provided a rim made in two halves, separable in the middle, the two halves of which may be readily secured together or readily separated for removing the rim from the tire and placing thereon as desired, that the fastening means provides substantial and efficient means for securing the two half members together, that the lugs 1ᵃ and 2ᵃ on the separate halves engage slots on the other halves and prevent their movement torsionally relatively to each other, that the rim may be formed in the various shapes for the various types of tires, and that the structure is simple and economical of construction and easy to operate.

Having thus described my invention, what I claim as new and desire to secure by Letters Patent is:

1. A demountable rim of the class described comprising duplicate, interchangeable rim members, each having a tire retaining flange at its outer edge and the two members being adapted to abut edge to edge at their inner edges said meeting edges having arranged spaced thereabout a plurality of projections and recesses therefor whereby to prevent relative circumferential movement of one member with respect to the other, and arranged between said projections and recesses a series of hook members, those of one engageable with the other rim member to hold said rim members in the interlocking engagement preventing separation.

2. A new article of manufacture comprising a rim section adapted to form an interchangeable one-half of a demountable rim having at one side thereof a tire retaining flange and at its other side alternately projecting lugs, the said side also having recesses therein to receive the aforesaid lugs of the complemental section, a plurality of pivotally mounted hooks, and other lugs projecting from the surface of the section with which the hooks of the complemental sections are engageable to hold the sections together.

In testimony whereof, I have hereunto set my hand at San Diego, California, this 13th day of December, 1916.

WILLIAM G. ADAMS.